United States Patent
Jeon (10) Patent No.: US 7,478,857 B2
(45) Date of Patent: Jan. 20, 2009

(54) CENTER UPPER TRAY

(75) Inventor: Duk-Chul Jeon, Incheon (KR)

(73) Assignee: Hyundai Mobis Co., Ltd., Seoul (KR)

( * ) Notice: Subject to any disclaimer, the term of this patent is extended or adjusted under 35 U.S.C. 154(b) by 433 days.

(21) Appl. No.: 11/299,692

(22) Filed: Dec. 13, 2005

(65) Prior Publication Data

US 2007/0018474 A1  Jan. 25, 2007

(30) Foreign Application Priority Data

Jul. 7, 2005  (KR)  ..................... 10-2005-0061227

(51) Int. Cl.
*B60N 3/12*  (2006.01)
(52) U.S. Cl. .................................. 296/37.12
(58) Field of Classification Search .............. 296/37.12; 220/315; 292/336.3, DIG. 46, DIG. 31; 206/562, 563, 560
See application file for complete search history.

(56) References Cited

U.S. PATENT DOCUMENTS

| | | | | |
|---|---|---|---|---|
| 3,132,892 | A * | 5/1964 | Stevens | 296/37.12 |
| 3,330,593 | A * | 7/1967 | Pollak | 296/76 |
| 3,464,240 | A * | 9/1969 | Brody et al. | 292/163 |
| 3,581,532 | A * | 6/1971 | Andersen et al. | 70/84 |
| 4,355,837 | A * | 10/1982 | Shimizu et al. | 296/37.12 |
| 4,423,812 | A * | 1/1984 | Sato | 296/37.12 |
| 4,552,399 | A * | 11/1985 | Atarashi | 296/37.12 |
| 4,715,529 | A * | 12/1987 | Bixler | 206/521.1 |
| 4,848,627 | A * | 7/1989 | Maeda et al. | 224/275 |
| 4,896,520 | A | 1/1990 | Bruhnke et al. | |
| 5,190,259 | A * | 3/1993 | Okazaki | 248/311.2 |
| 5,197,775 | A * | 3/1993 | Reeber | 296/37.12 |
| 5,267,761 | A * | 12/1993 | Curtindale et al. | 292/81 |
| D349,092 | S * | 7/1994 | Snyder | D12/415 |
| 5,516,016 | A * | 5/1996 | Anderson et al. | 224/282 |
| 5,520,313 | A * | 5/1996 | Toshihide | 296/37.12 |
| 5,603,540 | A * | 2/1997 | Shibao | 292/341.15 |
| 5,620,122 | A * | 4/1997 | Tanaka | 296/37.15 |
| 5,680,974 | A * | 10/1997 | Vander Sluis | 296/37.9 |
| 5,718,405 | A * | 2/1998 | Adachi | 248/311.2 |
| 5,823,337 | A * | 10/1998 | Yunger et al. | 206/315.11 |

(Continued)

FOREIGN PATENT DOCUMENTS

JP  7-133685  5/1995

(Continued)

*Primary Examiner*—Kiran B. Patel
(74) *Attorney, Agent, or Firm*—Greenblum & Bernstein, P.L.C.

(57) ABSTRACT

A center upper tray having an improved locking structure so that the tray is not undesirably opened by inertial force and head impact and efficiency in manufacturing the center upper tray is improved. The center upper tray is installed in front of front seats of a vehicle, and includes a center upper tray housing having an opened upper surface for forming a designated receiving space therein; a door rotatably connected to one side of the center upper tray housing for covering the receiving space; a knob formed at one side of the upper surface of the door such that the knob can move horizontally, and having a latching portion at the lower portion thereof; and a latching groove formed in the center upper tray housing such that the latching groove corresponds to the latching portion of the knob, and selectively connected to the latching portion of the knob according to the horizontal movement of the knob.

6 Claims, 6 Drawing Sheets

U.S. PATENT DOCUMENTS

| | | | | |
|---|---|---|---|---|
| 5,823,612 A * | 10/1998 | Angelo | | 296/37.12 |
| 5,868,448 A * | 2/1999 | Izumo | | 296/37.12 |
| 5,904,389 A * | 5/1999 | Vaishnav et al. | | 296/37.12 |
| 5,921,029 A * | 7/1999 | Stukerjurgen | | 296/37.12 |
| 5,971,461 A * | 10/1999 | Vaishnav et al. | | 296/37.12 |
| 6,065,729 A * | 5/2000 | Anderson | | 248/311.2 |
| 6,152,512 A * | 11/2000 | Brown et al. | | 296/37.12 |
| 6,206,260 B1 * | 3/2001 | Covell et al. | | 224/539 |
| 6,213,533 B1 * | 4/2001 | Widulle et al. | | 296/37.12 |
| 6,470,627 B2 * | 10/2002 | Fukuo | | 49/260 |
| 6,601,897 B2 * | 8/2003 | Stelandre et al. | | 296/37.12 |
| 6,622,965 B1 * | 9/2003 | Sergiy | | 244/118.1 |
| 6,692,053 B1 * | 2/2004 | Smith | | 296/37.1 |
| 6,715,727 B2 * | 4/2004 | Sambonmatsu | | 248/311.2 |
| 6,722,718 B2 * | 4/2004 | Brown et al. | | 296/37.12 |
| 6,749,079 B2 * | 6/2004 | Katagiri et al. | | 220/345.2 |
| 6,804,858 B2 * | 10/2004 | Yazawa et al. | | 16/289 |
| 6,820,921 B2 * | 11/2004 | Uleski | | 296/37.9 |
| 6,854,778 B2 * | 2/2005 | Lee | | 296/37.12 |
| 6,863,329 B2 * | 3/2005 | Fero | | 296/37.8 |
| 6,890,008 B1 * | 5/2005 | Chuang et al. | | 292/121 |
| 6,976,722 B2 * | 12/2005 | You | | 296/37.12 |
| 7,004,517 B2 * | 2/2006 | Vitry et al. | | 296/37.12 |
| 7,137,659 B2 * | 11/2006 | Tiesler et al. | | 296/37.12 |
| 7,152,898 B2 * | 12/2006 | Augustyniak | | 296/37.12 |
| 7,243,970 B2 * | 7/2007 | Kogami | | 296/37.9 |
| 2003/0075945 A1 * | 4/2003 | Zierle et al. | | 296/37.12 |
| 2003/0165398 A1 * | 9/2003 | Waldo et al. | | 422/22 |
| 2005/0133523 A1 | 6/2005 | Kim | | |
| 2006/0066120 A1 * | 3/2006 | Svenson et al. | | 296/37.12 |
| 2006/0183505 A1 * | 8/2006 | Willrich | | 455/566 |
| 2007/0018474 A1 * | 1/2007 | Jeon | | 296/37.8 |
| 2008/0073928 A1 * | 3/2008 | Woo | | 296/37.12 |

FOREIGN PATENT DOCUMENTS

JP        11-034747        2/1999

* cited by examiner

CENTER UPPER TRAY

BACKGROUND OF THE INVENTION

1. Field of the Invention

The present invention relates to a center upper tray, and more particularly to a center upper tray having an improved locking structure so that the center upper tray is not undesirably opened by inertial force and head impact

2. Description of the Related Art

Generally, a gauge board is mounted in front of the driver's seat of an instrument panel of a vehicle, and a glove box is mounted in front of a seat next to the driver's side of the instrument panel.

A center fascia is formed between the driver's seat and the seat next to the driver's side. A switch for operating an audio system or an air conditioning system is formed on the center fascia.

Further, a tray for collecting tobacco ashes or receiving articles having small volume, such as coins or cards, is formed in the center fascia. Such a tray may be formed in other positions inside the vehicle instead of the at the center fascia.

Particularly, in order to obtain a wider collecting space for the tray, a center upper tray is mounted in the upper surface of the center fascia.

Figure 1:
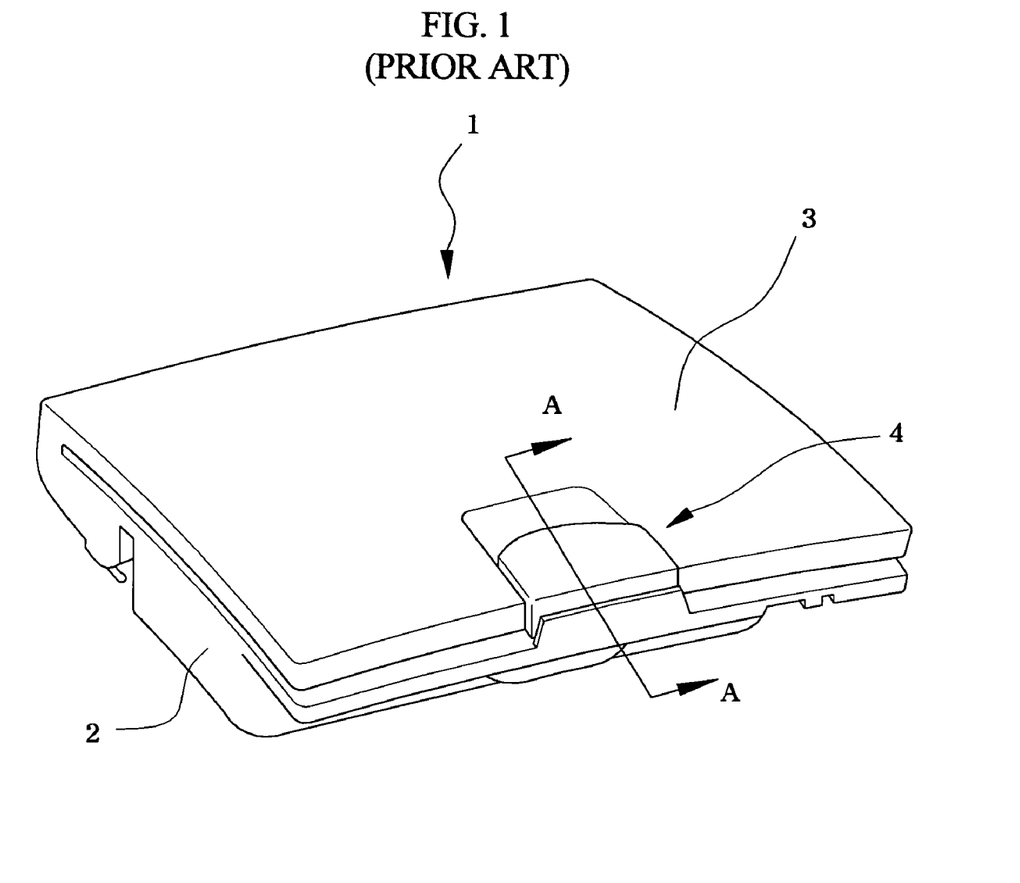
FIG. 1 is a perspective view of a conventional center upper tray in a closed state.
Figure 2:
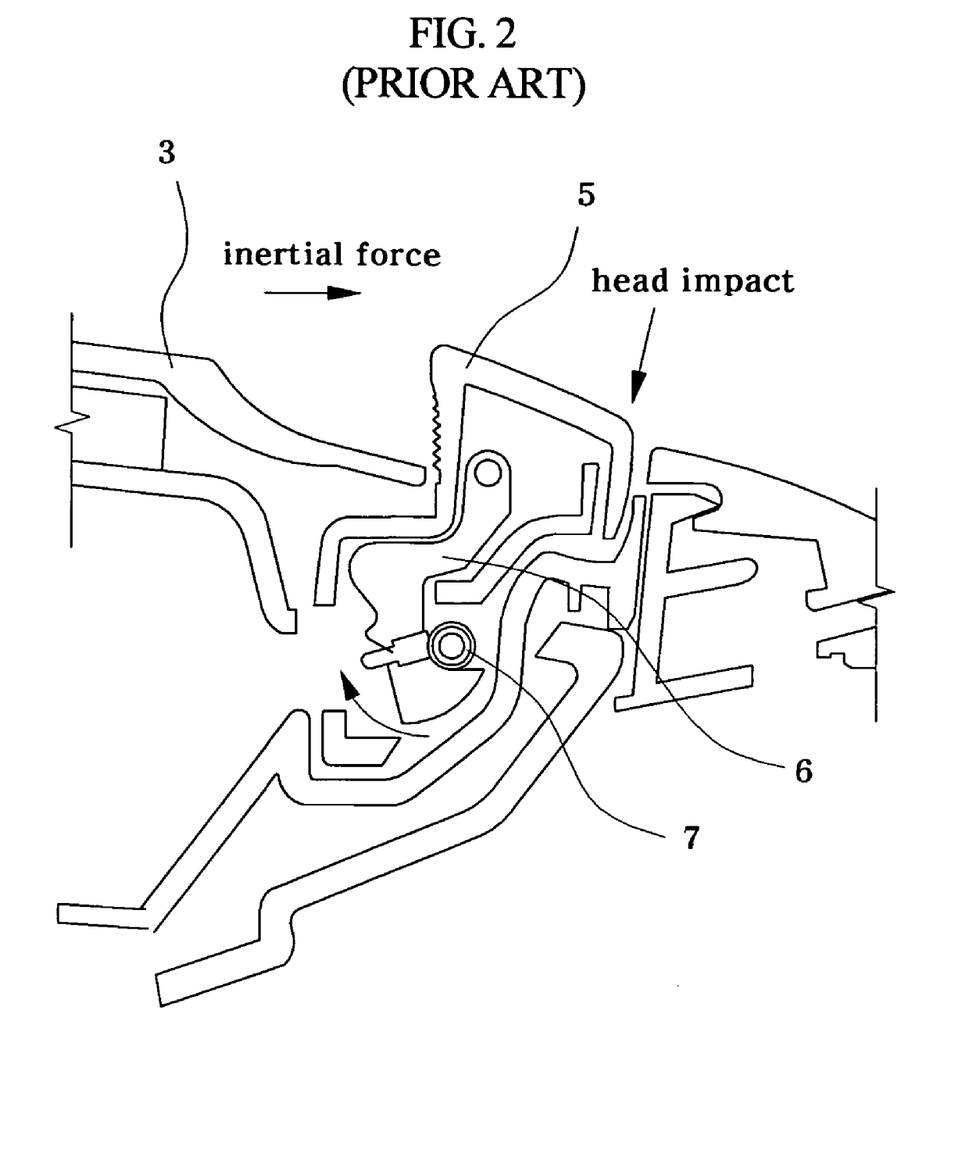
FIG. 2 is a sectional view taken along the line A-A of FIG. 1.

FIG. 1 is a perspective view of a conventional center upper tray in a closed state, and FIG. 2 is a sectional view taken along the line A-A of FIG. 1.

As shown in FIGS. 1 and 2, the conventional center upper tray 1 comprises a center upper tray housing 2, a door 3, and a locking member 4.

The center upper tray housing 2 has a hollow hexahedral structure, the upper surface of which is opened to form a receiving space therein.

The door 3 is rotatably hinged to the upper surface of the center upper tray housing 2 (the upper part of the left portion in FIG. 1), thereby selectively opening and closing the upper surface of the center upper tray housing 2.

The door 3 is fixed to the center upper tray housing 2 by the locking member 4 under the condition that the upper surface of the center upper tray housing 2 is closed by the door 3.

The locking member 4 is formed at one side of the door 3, and comprises a knob 5, a latching portion 6, and a latching rod 7.

The knob 5 is protruded from the upper surface of the door 3, and the lower end of the knob 5 contacts the latching portion 6.

The end of the latching portion 6 has a hook shape, and the latching rod 7 is formed at a portion of the center upper tray housing 2 corresponding to the hook-shaped end of the latching portion 6.

In a normal state, the latching portion 6 is latched onto the latching rod 7.

When a driver pulls the knob 5, the latching portion 6 is rotated by the movement of the knob 5, and the hook-shaped end of the latching portion 6 is separated from the latching rod 7 by the above rotation.

When the hook-shaped end of the latching portion 6 is separated from the latching rod 7, the locking member 4 is in a released state, thereby opening the door 3.

In the above structure of the center upper tray, which is opened by pulling the knob towards a driver, the opening direction of the knob coincides with the applied direction of the inertial force, thereby causing the center upper tray to be undesirably opened when an inertial force testing of the center upper tray is performed.

Further, upon impact, such as head impact, is applied to the center upper tray, the opening direction of the knob coincides with the applied direction of the head impact Thereby, the knob is rotated by the head impact, and the latching portion 6 is separated from the latching rod 7, thereby causing the center upper tray to be undesirably opened.

The above undesirable opening of the center upper tray does not satisfy related regulations, and causes injury to passengers.

Further, the above structure of the center upper tray requires many components of the locking member, thereby increasing the number of steps of an assembly process and thus deteriorating efficiency in manufacturing the center upper tray.

SUMMARY OF THE INVENTION

Therefore, the present invention has been made in view of the above problems, and it is an object of the present invention to provide a center upper tray having an improved locking structure so that the tray is not undesirably opened by inertial force or head impact and efficiency in manufacturing the center upper tray is improved.

In accordance with the present invention, the above and other objects can be accomplished by the provision of a center upper tray installed in front of front seats of a vehicle comprising: a center upper tray housing having an opened upper surface for forming a designated receiving space therein; a door rotatably connected to one side of the center upper tray housing for covering the receiving space; a knob formed at one side of the upper surface of the door such that the knob can move horizontally, and having a latching portion at the lower portion thereof; and a latching groove formed in the center upper tray housing such that the latching groove corresponds to the latching portion of the knob, and selectively connected to the latching portion of the knob according to the horizontal movement of the knob.

Preferably, the knob may slidably move right and left centering on a driver's seat. Further, preferably, the latching portion may have a hook shape, and the latching groove may be extended to a position corresponding to the hook-shaped latching portion.

The center upper tray may further comprise a returning device for returning the knob to its original position, and the returning device may be an elastic spring, one end of which is connected to the knob, and the other end of which is supported by the body of the door.

The center upper tray may further comprise guide protrusions formed at both ends of the knob; and guide rails formed in positions of the door corresponding to the guide protrusions.

In the center upper tray of the present invention, the knob moves horizontally in a lengthwise direction, the latching portion formed at the lower end of the knob is selectively inserted into or released from the latching groove formed in the center upper tray housing according to the horizontal movement of the knob.

Thereby, the directions of inertial force and head impact, which are applied to the center upper tray, differ from the opening direction of the knob, thus preventing the door from being undesirably opened by the inertial force and the head impact.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the annexed drawings. This embodiment does not limit the scope or spirit of the invention, but has been made only for a better understanding of the invention.

Figure 3A:
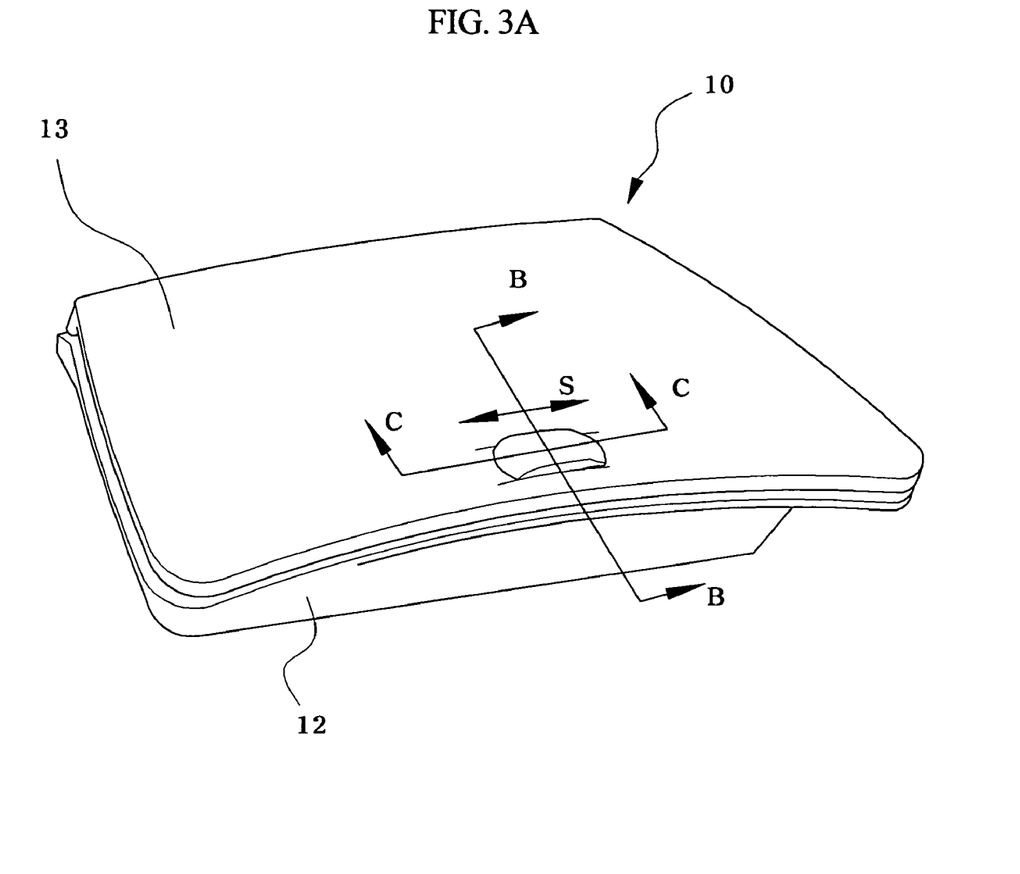
FIG. 3A is a perspective view of a center upper tray in accordance with an embodiment of the present invention in a closed state.
Figure 3B:
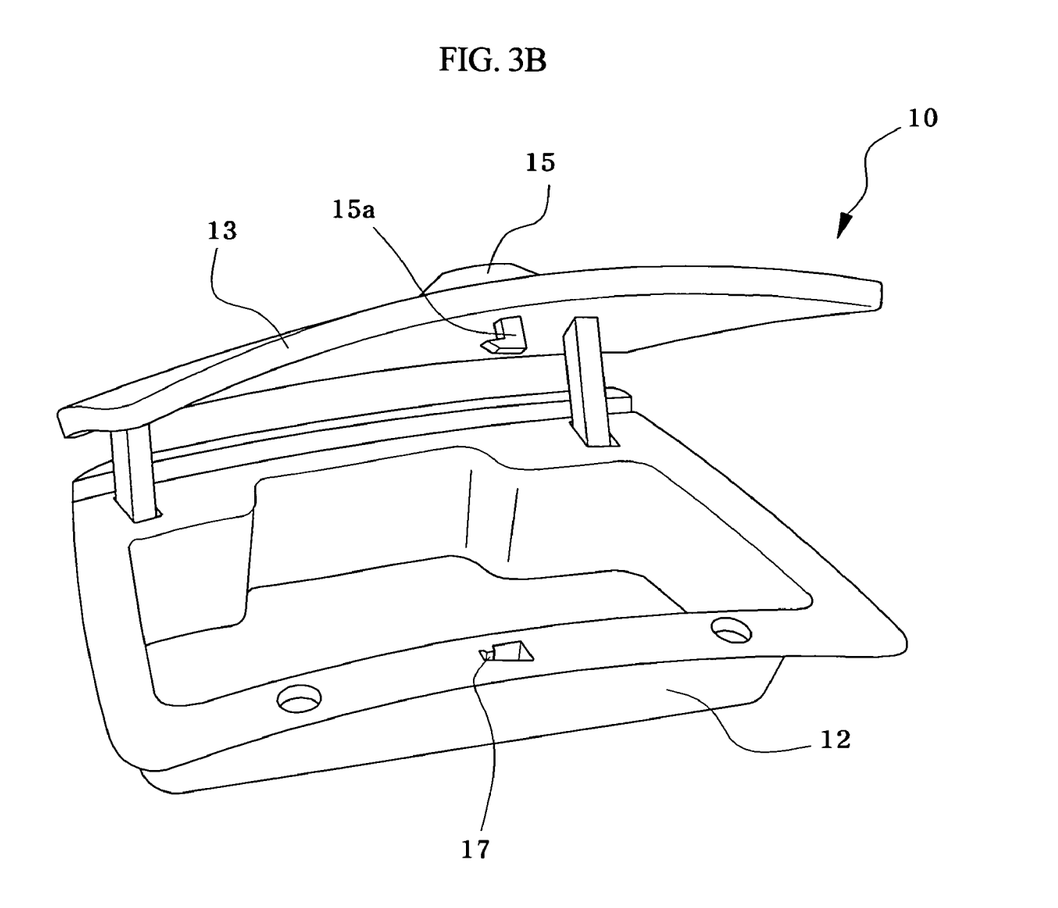
FIG. 3B is a perspective view of the center upper tray in accordance with the embodiment of the present invention in an opened state.
Figure 4:
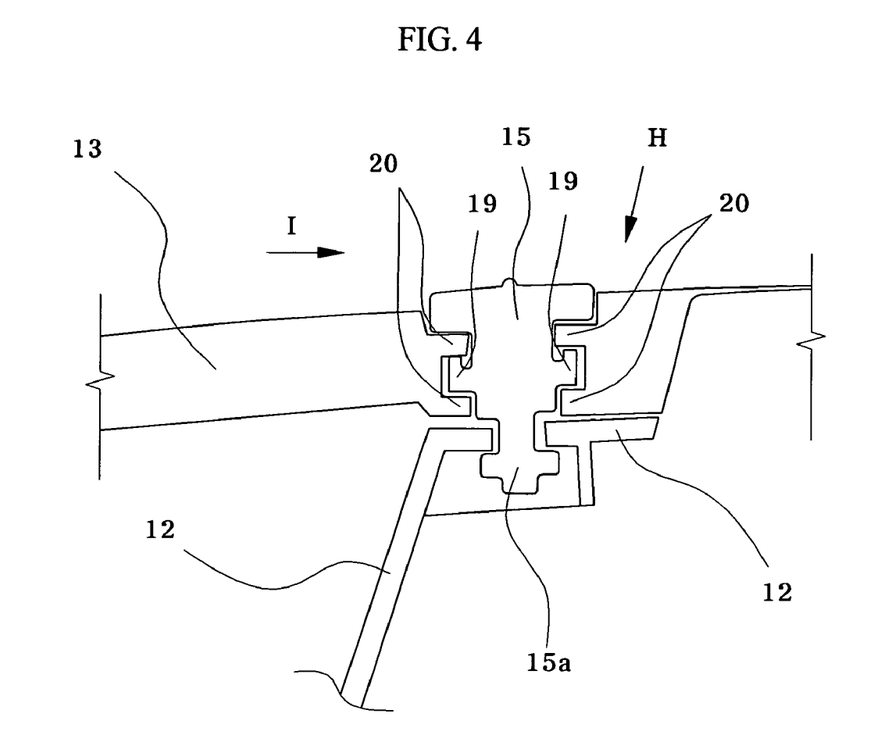
FIG. 4 is a sectional view taken along the line B-B of FIG. 3A.
Figure 5:
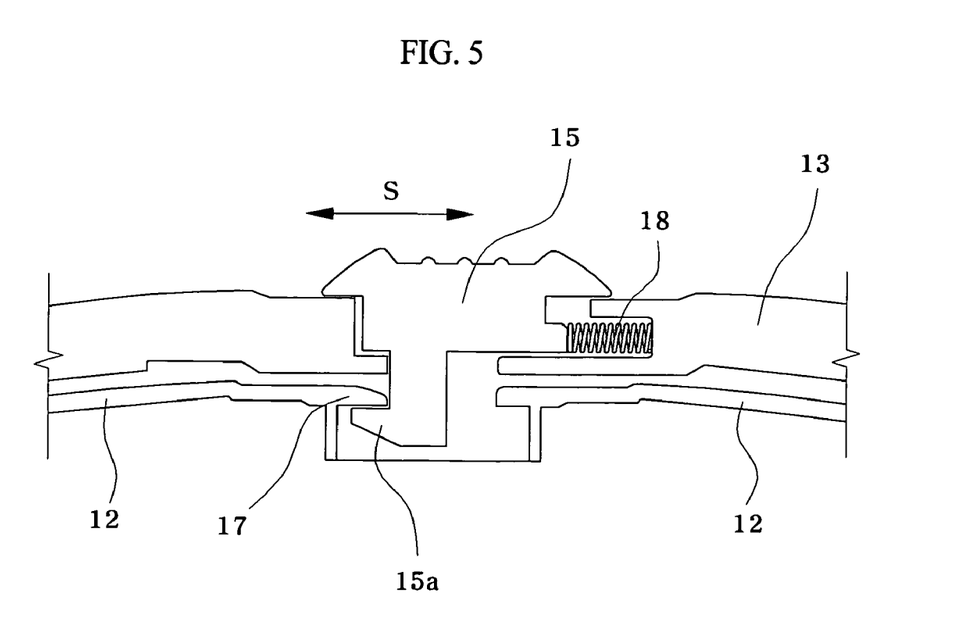
FIG. 5 is a sectional view taken along the line C-C of FIG. 3A.
Figure 6:
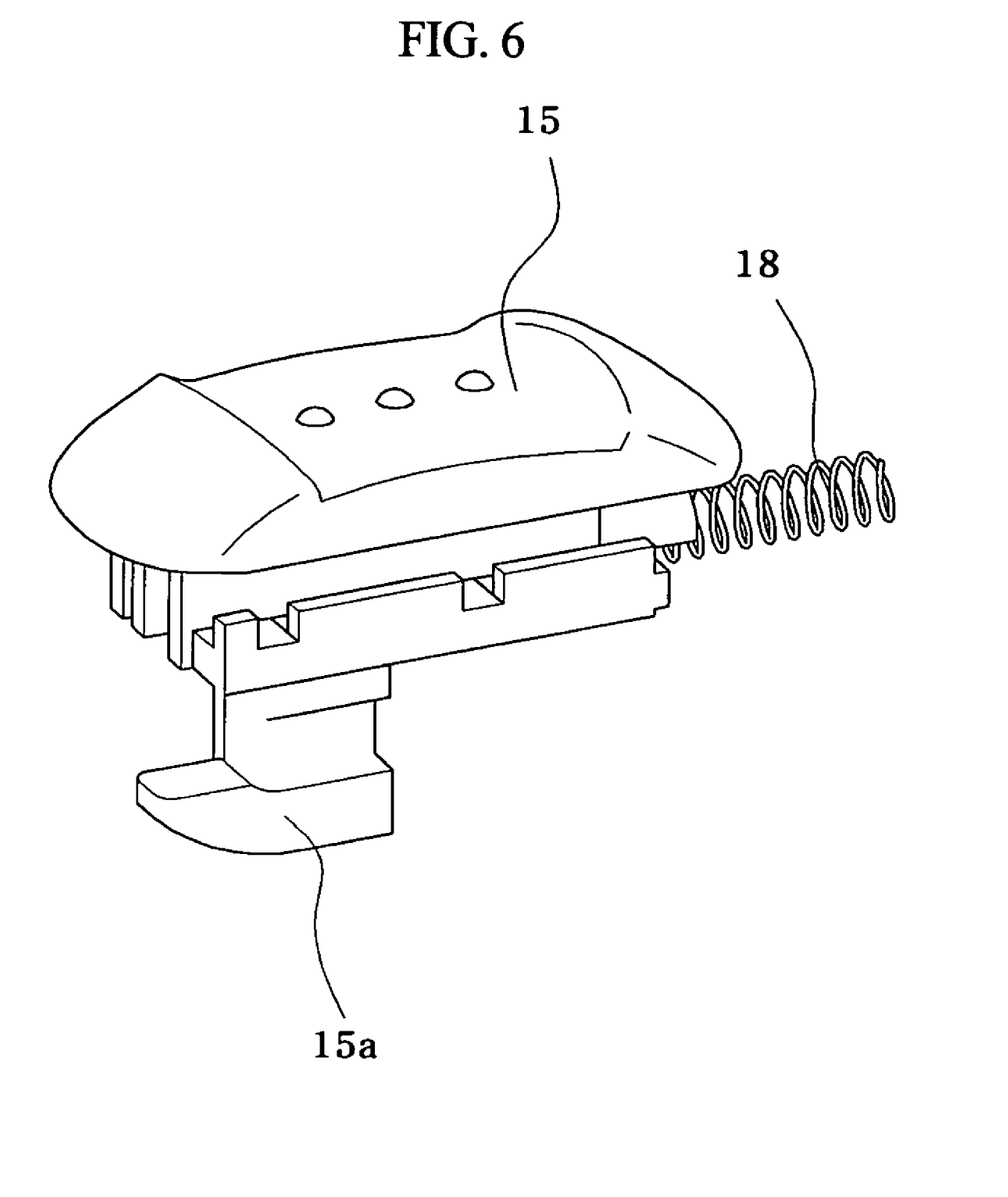
FIG. 6 is a perspective view of a knob of the center upper tray in accordance with the embodiment of the present invention.

FIG. 3A is a perspective view of a center upper tray in accordance with an embodiment of the present invention in a closed state, and FIG. 3B is a perspective view of the center upper tray in accordance with the embodiment of the present invention in an opened state. FIG. 4 is a sectional view taken along the line B-B of FIG. 3A. FIG. 5 is a sectional view taken along the line C-C of FIG. 3A. FIG. 6 is a perspective view of a knob of the center upper tray in accordance with the embodiment of the present invention.

As shown in FIGS. 3A and 3B, and FIGS. 4 to 6, the center upper tray in accordance with an embodiment of the present invention comprises a center upper tray housing 12, a door 13, a knob 15, a latching portion 15a, a latching groove 17, and an elastic spring 18.

The center upper tray housing 12 is installed on a center fascia installed in front of the driver's seat and the seat next to the driver's side.

The center upper tray housing 12 has a hollow hexahedral structure having an opened upper surface.

The door 13 is rotatably connected to the upper surface of the center upper tray housing 12.

The door 13 selectively opens and closes the upper surface of the center upper tray housing 12 according to its rotated state.

The knob 15 is formed at one side of the door 13 at the driver's seat The knob 15 horizontally slides in the lengthwise direction.

The sliding direction (S) of the knob 15 is perpendicular to the applied direction (I) of inertial force, and does not coincide with the applied direction (H) of head impact The latching portion 15a is installed at the lower portion of the knob 15. The latching portion 15a has a hook shape.

Further, the latching groove 17 is formed in a position of the center upper tray housing 12 corresponding to the latching portion 15a.

The latching groove 17 has a shape corresponding to the shape of the latching portion 15a such that the latching portion 15a is separated from the latching groove 17 by the movement of the knob 15.

The elastic spring 18 for returning the knob 15 to its original position when the knob 15 moves in a designated direction, is provided at one side of the knob 15.

One end of the elastic spring 18 is connected to the knob 15, and the other end of the elastic spring 18 is supported by a body of the door 13.

When a user applies a pressure to the knob 15 so that the knob 15 is moved to the right, the latching portion 15a of the knob 15 is separated from the latching groove 17 and the elastic spring 18 is compressed.

When the user rotates the door 13 under the condition that the latching portion 15a is separated from the latching groove 17, so as to open the tray 10, and the user releases the pressure from the knob 15, the knob 15 is returned to its original position by the restoring force of the elastic spring 18.

Guide protrusions 19 having a designated height are respectively protruded from front and rear side surfaces of the knob 15.

The guide protrusions 19 are protruded in a lengthwise direction of the knob 15 (in the lateral direction in FIG. 4), and the knob 15 slides under the condition that the guide protrusions 19 are inserted into guide rails 20 formed in the door 13.

Hereinafter, the function of the above center upper tray 10 of this embodiment of the present invention will be described.

In order to open the center upper tray 10, a user presses the knob 15 to the right When the knob 15 moves to the right, the latching portion 15a formed at the lower portion of the knob 15 is separated from the latching grove 17 formed in the center upper tray housing 12, and the door 13 reaches a locking-releasing state.

When the knob 15 slidably moves, terminals of the guide protrusions 19 formed on the front and rear side surfaces of the knob 15 are inserted into the guide rails 20 formed in the door 13.

The guide protrusions 19 and the guide rails 20 guide the rectilinear movement of the knob 15, thereby more stably assuring the rectilinear movement of the knob 15.

When the latching portion 15a is separated from the latching groove 17, the door 13 is rotated to open the center upper tray housing 12.

That is, the center upper tray 10 is opened by moving the knob 15 in a lengthwise direction.

When an inertial force test is performed on the above center upper tray 10, inertial force is applied to the center upper tray 10 in the direction of "I" of FIG. 4.

The applied direction (I) of the inertial force is perpendicular to the opening direction of the knob 15. Although the inertial force is applied to the center upper tray 10, the inertial force is applied to the knob 15 in the widthwise direction, but is not applied to the knob 15 in the lengthwise direction, thereby not effecting the opening and closing of the door 13.

Accordingly, although strong inertial force is applied to the center upper tray 10 during the inertial force test, the door 13 is not undesirably opened.

When a head impact is applied to the center upper tray 10, the head impact is applied to the center upper tray 10 in the direction of "H" of FIG. 4.

The applied direction (H) of the head impact is perpendicular to the opening direction of the knob 15. Although the head impact is applied to the center upper tray 10, the head impact is applied to the knob 15 in a widthwise direction, but is not applied to the knob 15 in a lengthwise direction, thereby not affecting the opening and closing of the door 13.

As apparent from the above description, the present invention provides a center upper tray, in which a knob moves in a lengthwise direction so that the center upper tray is not undesirably opened even when inertial force and heat impact is applied to the center upper tray.

The center upper tray comprises protrusions and guide rails for guiding the knob, thereby allowing the knob to stably move in a lengthwise direction.

The center upper tray has a simple structure having a latching portion, the knob moving in the lengthwise direction, and a latching groove into which the latching portion is inserted, thereby having improved productivity through a simple manufacturing process.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A center upper tray of a vehicle comprising:
   a center upper tray housing having an opened upper surface to form a designated receiving space therein;
   a door rotatably connected to one side of the center upper tray housing to cover the receiving space;
   a knob formed at one side of the upper surface of the door such that the knob can move laterally, and having a latching portion at a lower portion thereof; and
   a latching groove formed in the center upper tray housing such that the latching groove corresponds to the latching portion of the knob, the latching groove being selectively connected to the latching portion of the knob according to the lateral movement of the knob,
   wherein the knob includes a plurality of guide protrusions configured to be guided by slide rails provided in the door.

2. The center upper tray as set forth in claim 1, wherein the knob moves slidably and laterally.

3. The center upper tray as set forth in claim 1, wherein the latching portion has a hook shape, and the latching groove is extended to a position corresponding to the hook-shaped latching portion.

4. The center upper tray as set forth in claim 1, further comprising a returning device to return the knob to its original position.

5. The center upper tray as set forth in claim 4, wherein the returning device is an elastic spring, one end of which is connected to the knob, and the other end of which is supported by the body of the door.

6. The center upper tray as set forth in claim 1, wherein the guide protrusions are formed at both ends of the knob; and the guide rails are formed at positions of the door corresponding to the guide protrusions.

\* \* \* \* \*